(12) United States Patent
Liu et al.

(10) Patent No.: US 7,853,599 B2
(45) Date of Patent: Dec. 14, 2010

(54) FEATURE SELECTION FOR RANKING

(75) Inventors: Tie-Yan Liu, Beijing (CN); Geng Xiubo, Beijing (CN); Tao Qin, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 12/017,288

(22) Filed: Jan. 21, 2008

(65) Prior Publication Data
US 2009/0187555 A1   Jul. 23, 2009

(51) Int. Cl.
*G06F 17/30* (2006.01)
(52) U.S. Cl. ................ 707/748; 707/749; 707/754
(58) Field of Classification Search ........ 707/748, 707/749, 754, 999.006, 999.007, 999.107
See application file for complete search history.

(56) References Cited

U.S. PATENT DOCUMENTS

| | | |
|---|---|---|
| 6,192,360 B1 | 2/2001 | Dumais et al. |
| 6,466,929 B1 | 10/2002 | Brown et al. |
| 6,963,870 B2 | 11/2005 | Heckerman |
| 6,973,459 B1 | 12/2005 | Yarmus |
| 7,277,574 B2 * | 10/2007 | Liu et al. ............ 382/159 |
| 2002/0192686 A1 * | 12/2002 | Adorjan et al. ........ 435/6 |
| 2004/0102905 A1 | 5/2004 | Adorjan et al. |
| 2004/0148266 A1 | 7/2004 | Forman |
| 2005/0021317 A1 | 1/2005 | Weng et al. |
| 2005/0131847 A1 | 6/2005 | Weston et al. |
| 2005/0144147 A1 | 6/2005 | Lee et al. |
| 2005/0216426 A1 | 9/2005 | Weston et al. |
| 2006/0133666 A1 * | 6/2006 | Liu et al. ............ 382/159 |
| 2006/0224532 A1 * | 10/2006 | Duan et al. ............ 706/15 |
| 2008/0010304 A1 * | 1/2008 | Vempala et al. ....... 707/100 |

FOREIGN PATENT DOCUMENTS

WO   WO2007026130 A1   3/2007

OTHER PUBLICATIONS

Geng, et al., "Feature Selection for Ranking", available at least as early as Jun. 19, 2007, at <<http://tsintao.googlepages.com/qin-sigir07b.pdf>>, ACM, 2007, pp. 8.

Slotta, et al., "Algorithms for Feature Selection in Rank-Order Spaces", available at least as early as Jun. 19, 2007, at <<http://eprints.cs.vt.edu/archive/00000714/01/tech_report.pdf>>, 2005, pp. 27.

Wiratunga, et al., "Unsupervised Feature Selection for Text data", available at least as early as Jun. 19, 2007, at <<http://www.comp.rgu.ac.uk/staff/nw/Papers/Eccbr2006/eccbr2006nw.pdf>>, Springer, 2006, pp. 340-354.

* cited by examiner

*Primary Examiner*—Leslie Wong
(74) *Attorney, Agent, or Firm*—Lee & Hayes, PLLC

(57) ABSTRACT

This disclosure describes various exemplary methods, computer program products, and systems for selecting features for ranking in information retrieval. This disclosure describes calculating importance scores for features, measuring similarity scores between two features, selecting features that maximizes total importance scores of the features and minimizes total similarity scores between the features. Also, the disclosure includes selecting features for ranking that solves an optimization problem. Thus, this disclosure identifies relevant features by removing noisy and redundant features and speeds up a process of model training.

20 Claims, 5 Drawing Sheets

$$v_j = v_j - e_{2,j} \cdot 2c$$

FEATURE SELECTION FOR RANKING

TECHNICAL FIELD

The subject matter relates generally to information retrieval, and more specifically, to selecting features for ranking in information retrieval.

BACKGROUND

Information retrieval generally uses ranking for a set of objects (e.g., documents) by calculating a score for each of the objects and sorting the objects according to the scores. Depending on the type of applications, the scores may represent the degrees of relevance, preference, or importance. Traditionally, only a small number of strong features were used to represent relevance and to rank the documents. With the development of supervised learning algorithms like Ranking Support Vector Machines (SVM) and RankNet, there is a possibility to incorporate more features (either strong or weak) into ranking models.

Incorporating SVM into ranking models creates problems. The generalization ability of SVM depends on margin, which does not change with the addition of irrelevant features, and depends on the radius of training data points, which can increase when the number of features increases. The problem with this method is that the probability of over-fitting also increases as the dimension of feature space increases. As a result, over-fitting occurs and there remains a need for accuracy in machine learning. Furthermore, when applying Ranking SVM to a web search, a problem may occur such as training of ranking models cannot be completed in a timely manner or in an acceptable time period.

Other problems that commonly occur with information retrieval, especially in web searching, are that the data size is very large and training of the ranking models is very expensive. Additional problems include noisy features that are not relevant and the amount of time to train and test the ranking models.

Attempts in applying feature selection to ranking have been troublesome. First, there is a significant gap between classification and ranking. In ranking, a number of ordered categories are used, representing the ranking relationship between instances, while in classification the categories are "flat". Obviously, existing feature selection methods for classification are not suitable for ranking. Second, the evaluation measures (e.g. mean average precision (MAP) and normalized discounted cumulative gain (NDCG) used in ranking problems are different from those measures used in classification. Some of the differences are that precision is more important than recall in ranking while in classification both precision and recall are factors to consider. Furthermore, in ranking, correctly ranking the top-n instances is more important. While in classification, making a correct classification decision is of equal significance for most instances. These problems indicate there is a need for feature selection for ranking.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary methods, computer program products, and systems for selecting features for ranking in information retrieval. This disclosure describes calculating importance scores for features, measuring similarity scores between two features, selecting features that maximizes total importance scores of the features and minimizes total similarity scores between the features. Also, the disclosure includes selecting features for ranking that solves an optimization problem. Thus, this disclosure identifies relevant features by removing noisy and redundant features and speeds up a process of model training.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to various exemplary methods, computer program products, and systems for utilizing feature selection for ranking. The process describes computing importance scores for features, measuring similarity scores between two features, selecting features that maximizes total importance scores of the features and minimizes total similarity scores between the features. Also, the disclosure includes selecting features for ranking that solves an optimization problem. Thus, this disclosure identifies relevant features by removing noisy and redundant features and speeds up a process of model training.

In another aspect, the process includes a greedy search algorithm to solve the optimization problem. Thus, the greedy search algorithm includes constructing an undirected graph, using a node to represent a feature, representing the weight of the node and the weight of an edge between two nodes. Next, the algorithm constructing a set to contain the selected features. Then the algorithm selects the node with the largest weight without loss of generality, handicaps the other nodes, conducts a punishment on the other nodes, or decreases a weighted factor on the other nodes, according to the similarities, adds selected node, and removes the selected node from the graph with all the edges connected to it. Finally there is an output of the selected features.

The described feature selection ranking method improves efficiency and convenience during information retrieval for the user. Furthermore, the feature selection ranking method described minimizes redundancy among the features. By way of example and not limitation, the feature selection ranking method described herein may be applied to many contexts and environments. By way of example and not limitation, the feature selection ranking method may be implemented to support information retrieval for documents or web searching, search engines, enterprise networks, content websites, content blogs, and the like.

Illustrative Environment

Figure 1:
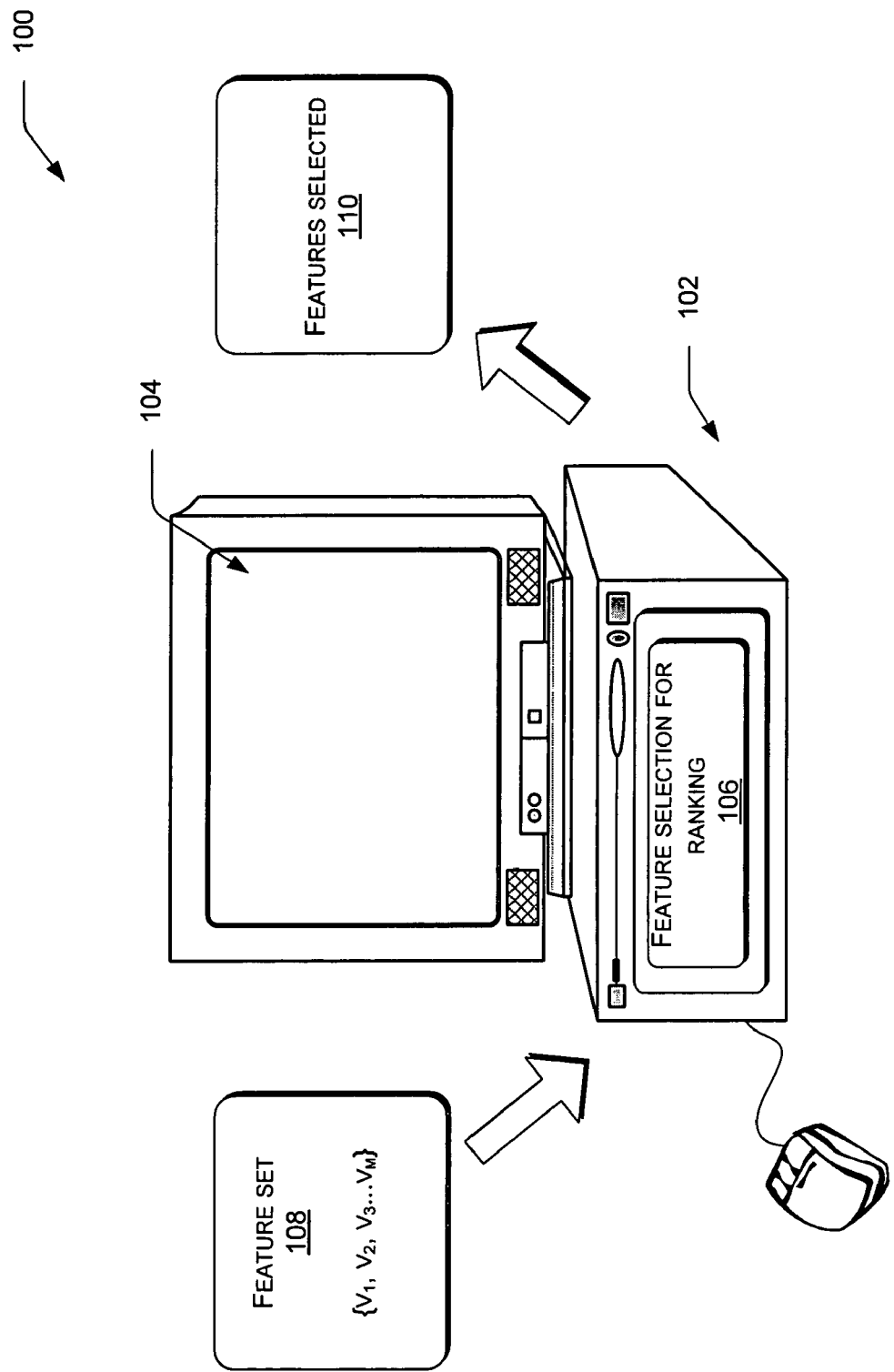
FIG. 1 is a block diagram of an exemplary system for feature selection for ranking.

FIG. 1 is an overview block diagram of an exemplary system 100 for selecting features for ranking in information retrieval. Shown is a computing device 102. Computing devices 102 that are suitable for use with the system 100, include, but are not limited to, a personal computer, a laptop computer, a desktop computer, a workstation computer, a personal digital assistance, a cellular phone, and the like. The computing device 102 may include a monitor 104 to display the features selected for ranking in information retrieval.

The system 100 may include feature selection for ranking as, for example, but not limited to, a tool, a method, a solver, software, an application program, a service, technology resources which include access to the internet, and the like. Here, the feature selection for ranking is implemented as an application program 106.

Feature selection for ranking application program 106 helps improve information retrieval. Typically, ranking methods were developed for classification. Feature selection methods in classification are divided into three categories. In the first category, filter, feature selection is defined as a preprocessing step and can be independent from learning. A filter method computes a score for each feature and then selects features according to the scores. The second category is wrapper, which utilizes the learning system as a black box to score subsets of features. The third category is the embedded method, which performs feature selection within the process of training. Among these three categories, the most comprehensively-studied methods are the filter methods, which is discussed in this disclosure.

Implementation of the feature selection for ranking application program 106 includes, but is not limited to, selecting t features from a feature set 108 $\{v_1, v_2, v_3, \ldots v_m\}$. The feature selection for ranking application program 106 makes use of ranking information, such as ranking list. The feature selection for ranking application program 106 assigns an importance score for each of the features and defines a similarity score between the features, where the similarity is a correlation between the ranking results of two features. The feature selection for ranking application program 106 formulates feature selection as an optimization problem.

After being processed through the feature selection for ranking application program 106, the features selected for ranking for information retrieval are shown in 110. Thus, the feature selection for ranking application program 106 selects features from a feature set 108 for ranking and returns relevant results of the features selected 110.

Illustrative Process

Figure 2:
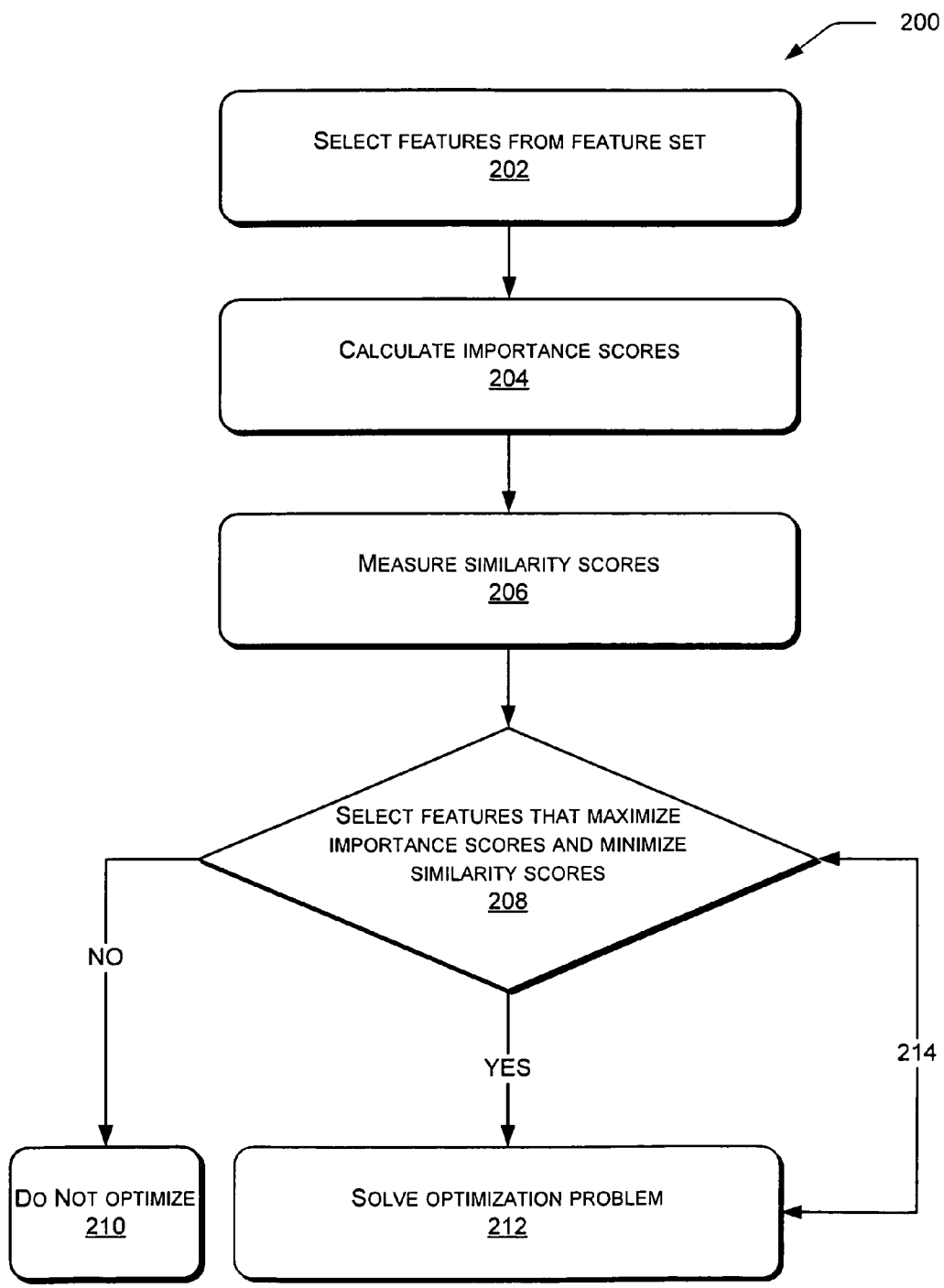
FIG. 2 is an overview flowchart showing an exemplary process for feature selection for ranking of FIG. 1.

Illustrated in FIG. 2 is an overview exemplary flowchart of a process 200 for implementing the feature selection for ranking application program 106 to provide a benefit to users by ranking features. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 200 provides an example of the feature selection for ranking application program 106 of FIG. 1. Starting at block 202 is selecting t features from a feature set 108 $\{v_1, v_2, v_3, \ldots v_m\}$. For example, t feature may be shown in a range, such that 1 is less than or equal to t feature and t feature may be less than or equal to m ($1 \leq t \leq m$).

At block 204, calculating an importance score for each feature $v_i$ is shown. The importance score may be calculated with evaluation metrics for ranking or the loss of ranking models. The evaluation measures, may include but is not limited to, a mean average precision (MAP) and a normalized discount cumulative gain (NDCG) or a loss of ranking models to compute the importance score 204.

The MAP and NDGG process includes ranking instances using the feature, evaluating the performance in terms of the measure, and taking the evaluation result as the importance score. The loss function includes ranking instances using the feature and defining the importance score of each feature as inversely proportional to the corresponding loss of ranking models. The value of a feature is used to sort the instances. For some features, larger values correspond to higher ranks while for other features smaller values correspond to higher ranks. Thus, when calculating MAP, NDCG or the loss of ranking models, the process sorts the instances for two times (in the normal order and in the inverse order), and takes the larger score from the two times as the importance score of the feature.

The evaluation metric, MAP is a measure on precision of ranking results. Common assumptions are that there are two types of documents: positive and negative (relevant and irrelevant). Precision at n measures an accuracy of top n results for a query, shown below:

$$P(n) = \frac{\text{number of positive instances within top } n}{n}$$

Average precision of a query is calculated based on precision at n:

$$AP = \sum_{n=1}^{N} \frac{P(n) \times pos(n)}{\text{number of positive instances}}$$

where n denotes position, N denotes number of documents retrieved, pos(n) denotes a binary function indicating whether the document at position n is positive. MAP is defined as AP averaged over the queries.

The other evaluation metric, normalized discount cumulative gain (NDCG) is designed for measuring ranking accuracies when there are multiple levels of relevance judgment. Given a query, NDCG at position n in is defined as $$N(n) = Z_n \sum_{j=1}^{n} \frac{2^{R(j)} - 1}{\log(1 + j)}$$

where n denotes position, R(j) denotes score for rank j, and Zn is a normalization factor to guarantee that a perfect ranking's NDCG at position n equals 1. For queries for which the number of retrieved documents is less than n, NDCG is only calculated for the retrieved documents. In evaluation, NDCG is further averaged over all queries.

The process 200 removes redundancy in the selected features. This is applicable when selecting only a small number of features but still wanting to keep enough information in these features. If most of the features selected are redundant (similar to each other), the combination of the features will not lead to significant performance gain over each of the features. On the other hand, if keeping some of these redundant features and leaving the space to new features (which are complementary to the existing features) the performance of feature combination may become much higher than the previous case.

Block 206 illustrates measuring similarity scores between two features, which is basically a correlation between the ranking results of two features. Here, measuring the similarity between features is based on their ranking performance. That is, each feature is considered a ranking model, and the similarity between two features is represented by the similarity between ranking results that the features produce. Methods to measure the distance between two ranking lists, include but is not limited to, a Spearman's footrule F, a rank correlation R, and a Kendall's τ tau coefficient.

Turning to Kendall's τ as an example for measuring a distance between two ranking results (ranking lists). The Kendall's τ value of query q for any two features $v_i$ and $v_j$ can be calculated as follows:

$$\tau_q(v_i, v_j) = \frac{\#\{(d_s, d_t) \in D_q \mid d_s \pi v_i d_t \text{ and } d_s \pi v_j d_t\}}{\#\{(d_s, d_t) \in D_q\}}.$$

where $D_q$ is a set of instance pairs $(d_s, d_t)$ in response to query q, where #{-} represents a number of element in a set, and $d_s \pi v_i d_t$ means that instance $d_t$ is ranked before $d_s$ according to their features $v_i$. For a set of queries, the $\tau_q(v_i, v_j)$ values of all queries are averaged. The corresponding result $\tau(v_i, v_j)$ is used as the final similarity measure between features $v_i$ and $v_j$. Thus, the process finds that $\tau(v_i, v_j) = \tau(v_j, v_i)$.

Block 208 illustrates selecting features for ranking that maximize total importance scores and minimize total similarity scores. The process 200 selects those features for ranking with a largest cumulative importance score and a least mutual similarity.

At block 208, if the features are not selected, the process takes a No branch to block 210, which illustrates the features that are not selected are not optimized.

Returning to block 208, the features that are selected are analyzed in equations to maximize importance scores and to minimize similarity scores. Mathematically, this can be represented as follows:

$$\max \Sigma_i \omega_i x_i$$

$$\min \Sigma_i \Sigma_{j \neq i} e_{i,j} x_i x_j$$

$$\text{s.t.} x_i \in \{0,1\} i=1,K,m$$

$$\Sigma_i x_i = t$$

Here τ is the number of selected features, $x_i=1$ (or 0) denotes feature $v_i$ is selected (or not), $\omega_i$ is the importance score of feature $v_i$, and $e_{i,j}$ is the mutual similarity between feature $v_i$ and feature $v_j$. In this process, $e_{i,j} = \tau(v_i, v_j)$, and it may be shown that $e_{i,j} = e_{j,i}$.

The equations shown above illustrate two objectives: to maximize the sum of the importance scores of individual features and to minimize the mutual similarity between selected features. Since multi-objective programming is not easy to solve, the process considers a common approach in optimization and converts multi-objective programming to a single-objective programming using linear combination as shown below:

$$\max \Sigma_i \omega_i x_i - c \Sigma_i \Sigma_{j \neq i} e_{i,j} x_i x_j$$

$$\text{s.t.} x_i \in \{0,1\} i=1,K,m$$

$$\Sigma_i x_i = t$$

where c is a parameter to balance the two objectives.

From block 208, the selected features proceeds to the Yes branch to block 212.

Block 212 illustrates solving an optimization problem using an algorithm. The process includes directly solving an integer programming problem which may include searching a whole feature space and a time complexity of $o(m^r)$.

Here, the process 200 includes adopting a greedy search algorithm by selecting features iteratively as shown as line 214 and the time complexity of $o(m^r)$.

For example, the greedy search algorithm may include constructing an undirected graph; using a node to represent a feature; representing a weight of the node and a weight of an edge between two nodes; constructing a set to contain selected features; selecting the node with a largest weight without loss of generality; conducting a punishment (handicapping or decreasing a weighted factor) on the other nodes according to the similarities (handicapping the other nodes or decreasing a weighting factor); adding a selected node, and removing the selected node from the graph with the edges connected to the selected node; and outputting a set that contains the selected features.

Exemplary Greedy Algorithm and Graph

Figure 3:
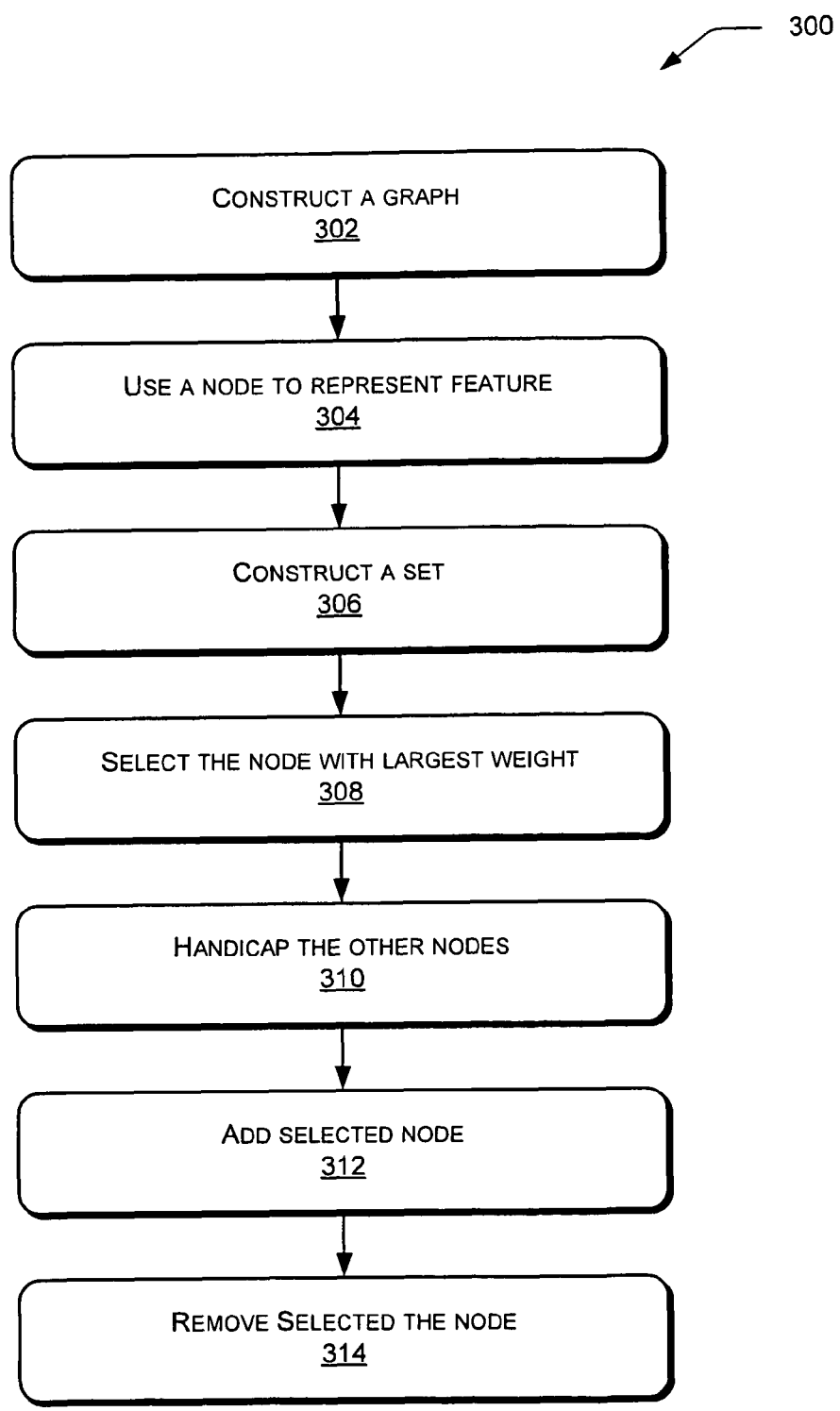
FIG. 3 is a flowchart showing an exemplary algorithm for the feature selection for ranking.
Figure 4:
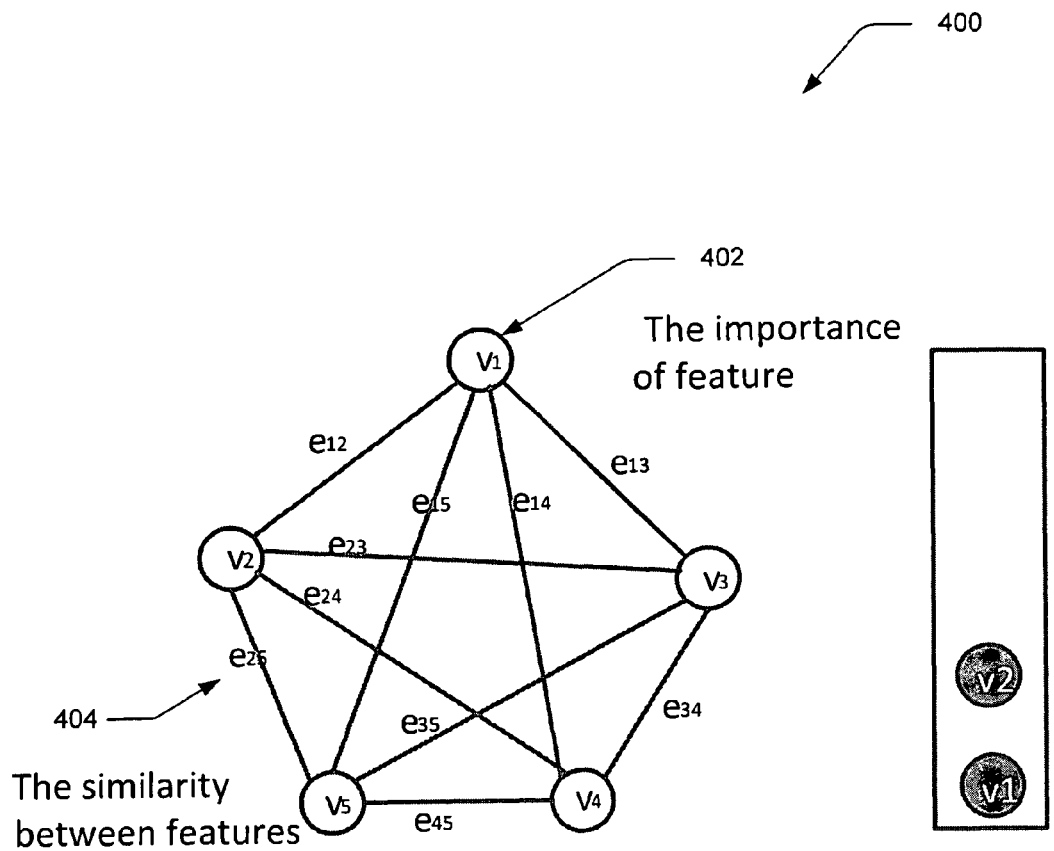
FIG. 4 is a block diagram of an exemplary graph for the feature selection for ranking.

FIGS. 3 and 4 illustrate an exemplary greedy algorithm and an exemplary graph, respectively, for feature selection for ranking application program 106. FIG. 3 is a flowchart illustrating an exemplary greedy algorithm for the feature selection for ranking application program 106 in detail of FIG. 2.

Block 302 illustrates constructing an undirected graph, where the undirected graph may be represented as $G_0$.

Block 304 shows using a node to represent a feature, where a feature is represented as $v_i$, wherein a weight of the node $v_i$ is represented by $\omega_i$, a weight of an edge is between a first node $v_i$ and a second node $v_j$, is represented by $e_{i,j}$.

Block 306 illustrates constructing a set to contain selected features. The set may be represented by S, initial state of S is $S_0 = \emptyset$.

Block 308 illustrates selecting a node with a largest weight without loss of generality. The process 300 represents the node with a largest weight as $v_{k_i}$.

Block 310 shows conducting a punishment (handicapping or decreasing a weighted factor) on the other nodes according to the similarities. The process 200 identifies nodes that have similarities to the node $v_{k_i}$, where nodes that are similar to the node with the largest weight $v_{k_i}$ are shown as:

$$\omega_j \leftarrow \omega_j - e_{k_i,j} * 2c, j \neq k_i.$$

Block 312 shows adding the selected node, which is the node with the largest weight $v_{k_i}$ to the set S.

Block 314 illustrates removing the selected node from the graph G together with edges connected to the selected node. As mentioned, the selected node with the largest weight is represented by $v_{k_i}$, which is removed from the graph G together with all the edges connected to the node using: $S_{i+1} = S_i Y \{v_{k_i}\}$, $G_{i+1} = G_i \backslash \{v_{k_i}\}$; and outputting the set $S_t$ to solve the optimization problem.

It is clear that the time complexity of the proposed algorithm is O(mt), which means that the algorithm is efficient. Furthermore, as indicated by Theorem 1, this greedy search algorithm could get the optimal solution to the linear combination problem under a certain condition. This condition has been widely used in many additive models, such as Boosting, to improve efficiency.

Turning to Theorem 1: the greedy search algorithm as described above may result in the optimal solution to the linear combination equation, under the condition that $S_{t+1} \supset S_t$, where $S_t$ denotes the selected feature set with $|S|=t$.

The proof for this Theorem 1 is presented as: the condition $S_{t+1} \supset S_t$ indicates that when selecting the (t+1)-th feature, the process will not change the already-selected t features. Denoting $S_t=(v_{k_i}|i=1, \ldots, t)$, where $v_{k_i}$ is the $k_i$-th feature and is selected in the i-th iteration. Then the task turns out to be finding the (t+1)-th feature so that the following objective can be maximized. Shown is the equation:

$$\max \Sigma_{i=1}^{t+1} \omega_{k_i} - c\Sigma_{i=1}^{t+1} \Sigma_{j=i}^{t+1} e_{kj,ki}.$$

Since $e_{k_i k_j}=e_{k_j k_i}$, the equation above may be rewritten as:

$$\max \Sigma_{i=1}^{t+1} \omega_{k_i} - 2c\Sigma_{i=1}^{t+1} \Sigma_{j=i+1}^{t+1} e_{ki,kj}.$$

Furthermore, since $S_{t+1} \supset S_t$ and $S_t=\{v_{k_i}|i=1, \ldots t\}$, the above equation equals to:

$$\max_s \{(\Sigma_{i=1}^{t} \omega_{k_i} - 2c\Sigma_{i=1}^{t-1} \Sigma_{j=i+1}^{t} e_{k_i k_j}) + (w_s - 2c\Sigma_{i=1}^{t} e_{k_i s})\}.$$

Note that the first part of the objective is a constant with respect to s, and so the goal is to select a node maximizing the second part. It is easy to see with the greedy search algorithm, the (t+1)-th iteration, that the current weight for each node $v_s$ is $(w_s - 2c \Sigma_{t=1}^{t} e_{k_t,s})$. Therefore, selecting the node with the largest weight in the greedy algorithm is equivalent to selecting the feature that satisfies the optimum requirements of the linear combination equation.

FIG. 4 is a block diagram of an exemplary graph 400 for the feature selection for ranking. Shown is a construction of an exemplary graph 400, where the nodes represent the importance of each feature 402. Also shown in the graph 400 is the edge 404, which represents the similarity between any two features V2 and V5.

The process selects features with the largest score, and handicaps or decreases a weighted factor for the features that are similar, according to their similarity. The process then removes the selected feature from the graph. Furthermore, the process selects features with the most important feature, punishes, handicaps or decreases a weight factor for the features that are similar, and removes the selected feature. This procedure continues until a desired number of features are selected.

Feature Selection for Ranking System

Figure 5:
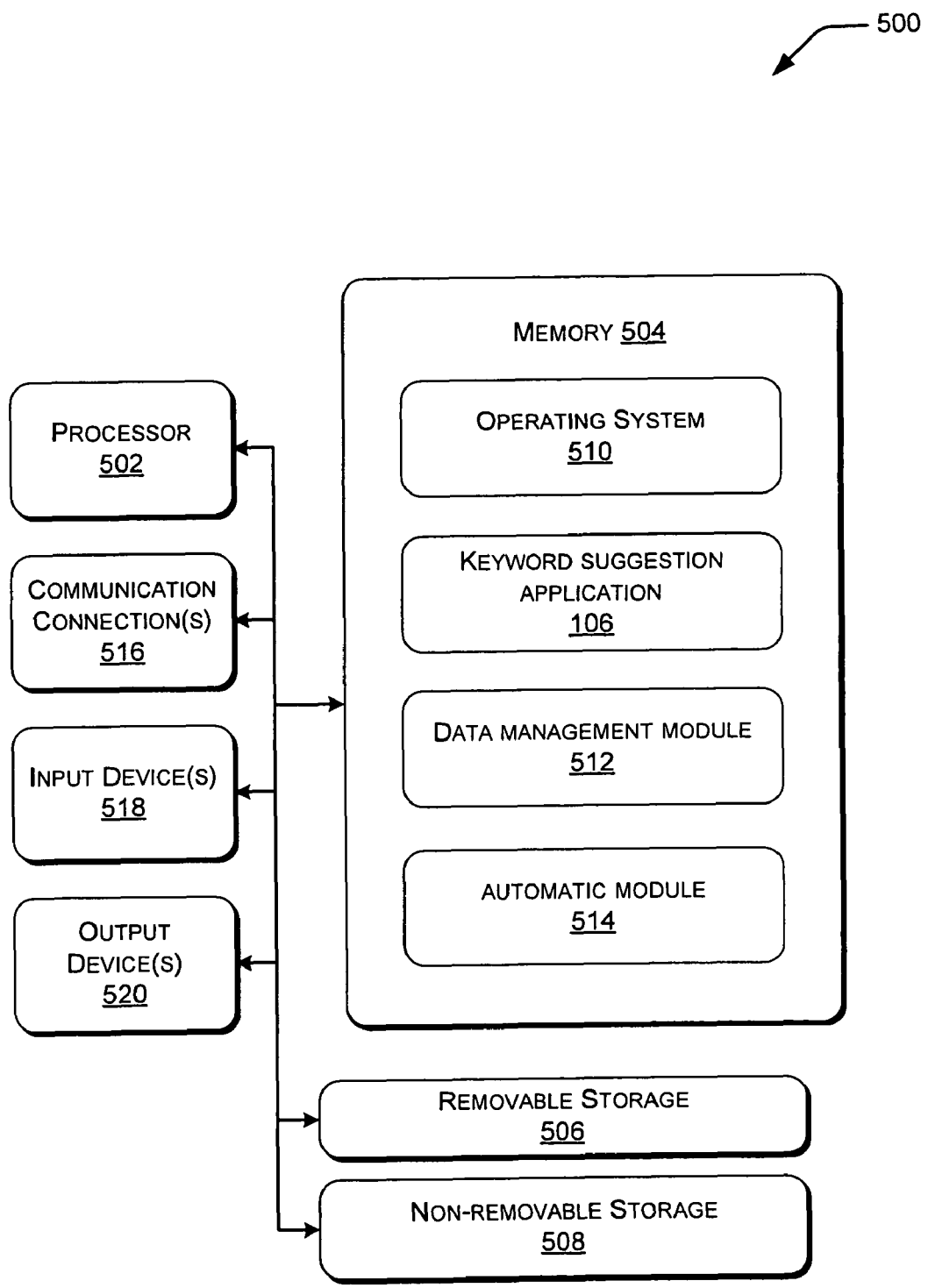
FIG. 5 is a block diagram showing details of an exemplary system for implementing feature selection for ranking.

FIG. 5 is a schematic block diagram of an exemplary general operating system 500. The system 500 may be configured as any suitable system capable of implementing feature selection for ranking application program 106. In one exemplary configuration, the system comprises at least one processor 502 and memory 504. The processing unit 502 may be implemented as appropriate in hardware, software, firmware, or combinations thereof. Software or firmware implementations of the processing unit 502 may include computer- or machine-executable instructions written in any suitable programming language to perform the various functions described.

Memory 504 may store programs of instructions that are loadable and executable on the processor 502, as well as data generated during the execution of these programs. Depending on the configuration and type of computing device, memory 504 may be volatile (such as RAM) and/or non-volatile (such as ROM, flash memory, etc.). The system may also include additional removable storage 506 and/or non-removable storage 508 including, but not limited to, magnetic storage, optical disks, and/or tape storage. The disk drives and their associated computer-readable medium may provide non-volatile storage of computer readable instructions, data structures, program modules, and other data for the communication devices.

Turning to the contents of the memory 504 in more detail, may include an operating system 510, one or more feature selection for ranking application program 106 for implementing all or a part of feature selection for ranking method. For example, the system 500 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 504 includes the feature selection for ranking application program 106, a data management module 512, and an automatic module 514. The data management module 512 stores and manages storage of information, such as features, feature sets, and the like, and may communicate with one or more local and/or remote databases or services. The automatic module 514 allows the process to operate without human intervention.

Memory 504, removable storage 506, and non-removable storage 508 are all examples of computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 500 may also contain communications connection(s) 516 that allow processor 502 to communicate with servers, the user terminals, and/or other devices on a network. Communications connection(s) 516 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 500 may also include input device(s) 518 such as a keyboard, mouse, pen, voice input device, touch input device, etc., and output device(s) 520, such as a display, speakers, printer, etc. The system 500 may include a database hosted on the processor 502. All these devices are well known in the art and need not be discussed at length here.

The subject matter described above can be implemented in hardware, or software, or in both hardware and software. Although embodiments of click-through log mining for ads have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of click-through log mining for ads. For example, the methodological acts need not be performed in the order or combinations described herein, and may be performed in any combination of one or more acts.

The invention claimed is:

1. A method to select features for ranking for information retrieval, implemented by a computing device, the method comprising:
   selecting the features iteratively;
   computing importance scores for the features, wherein the importance scores include ranking performances;
   measuring similarity scores between two features based on the ranking performances, wherein the similarity scores are based on a correlation between ranking results of the two features; and
   selecting the features that maximize a sum of the importance scores of individual features and that minimize a sum of the similarity scores between the selected features, wherein the features that are selected have a largest cumulative importance score and a least mutual similarity score;
   wherein the features selected for ranking are modeled as an optimization problem, the optimization problem includes:
      constructing an undirected graph and using a node to represent a feature;
      representing a weight of the node and a weight of an edge between two nodes; and
      constructing a set to contain the selected features.

2. The method of claim 1, wherein computing the importance scores comprises at least one of a mean average precision (MAP), a normalized discounted cumulative gain (NDCG), or a loss function.

3. The method of claim 1, wherein measuring the similarity scores comprises at least one of a Spearman's footrule F, a rank correlation R, or a Kendall tau coefficient.

4. The method of claim 1, wherein the maximizing the sum of the importance scores of the individual features and the minimizing the sum of the similarity scores between the selected features include:

$$\max \sum_i \omega_i x_i$$

$$\min \sum_i \sum_{j \neq i} e_{i,j} x_i x_j$$

$$\text{s.t.} \quad x_i \in \{0, 1\} \; i = 1, \ldots, m$$

$$\sum_i x_i = t$$

wherein t is a number of selected features;
   wherein $x_i=1$ (or 0) denotes whether feature $v_i$ is selected or not;
   wherein $\omega_i$ is an importance score of feature $v_i$;
   wherein $e_{i,j}$ is an edge that denotes a similarity between the features $v_i$ and $v_j$;
   wherein $e_{i,j=\tau(v_i v_j)}$; and
   wherein $e_{i,j=ej,i}$.

5. The method of claim 4, wherein the maximizing the sum of the importance scores of the individual features and the minimizing the sum of the similarity scores between the selected features further comprises using a linear combination of:

$$\max \sum_i \omega_i x_i - c \sum_i \sum_{j \neq i} e_{i,j} x_i x_j$$

$$\text{s.t.} \quad x_i \in \{0, 1\} \; i = 1, \ldots, m$$

$$\sum_i x_i = t$$

wherein c is a parameter to balance maximizing the the sum of the importance scores of individual features and minimizing the sum of the similarity scores between the selected features.

6. The method of claim 1, further comprising solving the optimization problem by using a greedy algorithm.

7. The method of claim 6, wherein the greedy algorithm further comprises:
   selecting the node with a largest weight without loss of generality;
   handicapping the other nodes according to the similarities;
   adding the selected node to the set and removing the selected node from the graph together with edges connected to the selected node; and
   outputting the set that contains the selected features.

8. The method of claim 7, wherein the greedy algorithm comprises selecting the features iteratively.

9. The method of claim 7, wherein the undirected graph is represented by $G_0$;
   wherein the feature is represented by $v_i$, wherein the weight of the node $v_i$ is represented by $\omega_i$, wherein the weight of the edge between a first node $v_i$ and a second node $v_j$ is represented by $e_{i,j}$;
   wherein the set is represented by S;
   wherein a node with a largest weight is $v_{k_i}$; and
   further comprising identifying nodes that have similarities to the node with the largest weight $v_{k_i}$;
   updating weights of the identified nodes by:

$\omega_j \leftarrow \omega_j - e_{k_i j} * 2c, j \neq k_i$;

adding the identified nodes with the largest weight $v_{k_i}$ to the set S;
   removing the node with the largest weight $v_{k_i}$ from the undirected graph together with edges connected to the node by:
   $S_{i+1}=S_i \cup \{v_{k_i}\}, G_{i+1}=G_i \setminus \{v_{k_i}\}$; and
   outputting the set $S_t$ to solve the optimization problem.

10. A computer-readable storage medium comprising computer-readable instructions executable on a computing device, the computer-readable instructions comprising:
   selecting features iteratively;
   defining an importance score for the features, wherein the importance score includes a ranking result;
   defining a similarity score between every two features based on the ranking result, wherein the similarity score is based on a correlation between ranking results of the two features;
   selecting the features that maximize total importance scores of the features and minimize total similarity scores of a set of features, wherein the features that are selected have a largest cumulative importance score and a least mutual similarity score;
   solving an optimization problem with the features that are selected for ranking; and
   using a greedy algorithm to solve the optimization problem, the greedy algorithm includes:
      constructing an undirected graph;

using a node to represent a feature;

representing a weight of the node and a weight of an edge between two nodes; and constructing a set to contain the selected features.

11. The computer-readable storage medium of claim 10, wherein defining the importance score comprises at least one of a mean average precision (MAP), a normalized discounted cumulative gain (NDCG), or a loss function.

12. The computer-readable storage medium of claim 10, wherein defining the similarity score comprises at least one of a Spearman's footrule F, a rank correlation R, or a Kendall tau coefficient.

13. The computer-readable storage medium of claim 10, wherein defining the similarity score includes using a Kendall tau coefficient;

wherein the Kendall tau coefficient is represented by $\tau$, the $\tau$ value of a query q for features $v_i$ and $v_j$ is calculated as:

$$\tau_q(v_i, v_j) = \frac{\#\{(d_s, d_t) \in D_q \mid d_s \pi v_i d_t \text{ and } d_s \pi v_j d_t\}}{\#\{(d_s, d_t) \in D_q\}};$$

wherein $D_q$ is a set of instance pairs $(d_s, d_t)$ in response to the query q;

wherein $\#\{\cdot\}$ represents a number of an element in a set;

wherein $d_s \prec v_i d_t$ means that instance $d_t$ is ranked before $d_s$ according to a feature $v_i$;

wherein for a set of queries, $\tau_q(v_i, v_j)$ values of queries are averaged; and wherein corresponding result $\tau(v_i, v_j)$ is used as a final similarity measure between the features $v_i$ and $v_j$.

14. The computer-readable storage medium of claim 10, wherein solving the optimization problem with the features selected for ranking comprises selecting the features with a largest cumulative importance score and a least mutual similarity score.

15. The computer-readable storage medium of claim 10, wherein the greedy algorithm further comprises:

selecting the node with a largest weight without loss of generality;

handicapping the other nodes according to the similarities;

adding a selected node to the set and removing the selected node from the undirected graph together with edges connected to the selected node; and outputting the set that contains the selected features.

16. A system for feature selection for ranking, comprising:

a processor;

a memory coupled to the processor, wherein the processor is configured for:

processing data to select features from an entire feature set;

assigning an importance score to the features, wherein the importance score includes ranking performance;

defining a similarity score between the features based on the ranking performance, wherein the similarity score is based on a correlation between ranking results of the two features;

using an algorithm to maximize cumulative importance score and minimize mutual similarity score of the features, the algorithm includes:

constructing an undirected graph and using a node to represent a feature;

representing a weight of the node and a weight of an edge between two nodes; and constructing a set to contain the selected features; and identifying the features that are selected for ranking, wherein the features that are selected have a largest cumulative importance score and a least mutual similarity score.

17. The system of claim 16, wherein the identifying the features comprises selecting the features that maximize total importance scores of the selected features and minimize total similarity scores between the selected features, wherein the features selected for ranking models an optimization problem.

18. The system of claim 16, wherein assigning the importance score comprises at least one of a mean average precision (MAP), a normalized discounted cumulative gain (NDCG), or a loss function.

19. The system of claim 16, wherein the algorithm further comprises constructing an undirected graph with nodes corresponding to the features and a weight of an edge between the nodes, wherein the edge represents a similarity between the features.

20. The system of claim 16, wherein the algorithm further comprises:

selecting a node with a largest weight without loss of generality;

handicapping the other nodes according to the similarities;

adding a selected node to the set and removing the selected node from the undirected graph together with edges connected to the selected node; and outputting the set that contains the selected features.

* * * * *